United States Patent Office 3,414,253
Patented Dec. 3, 1968

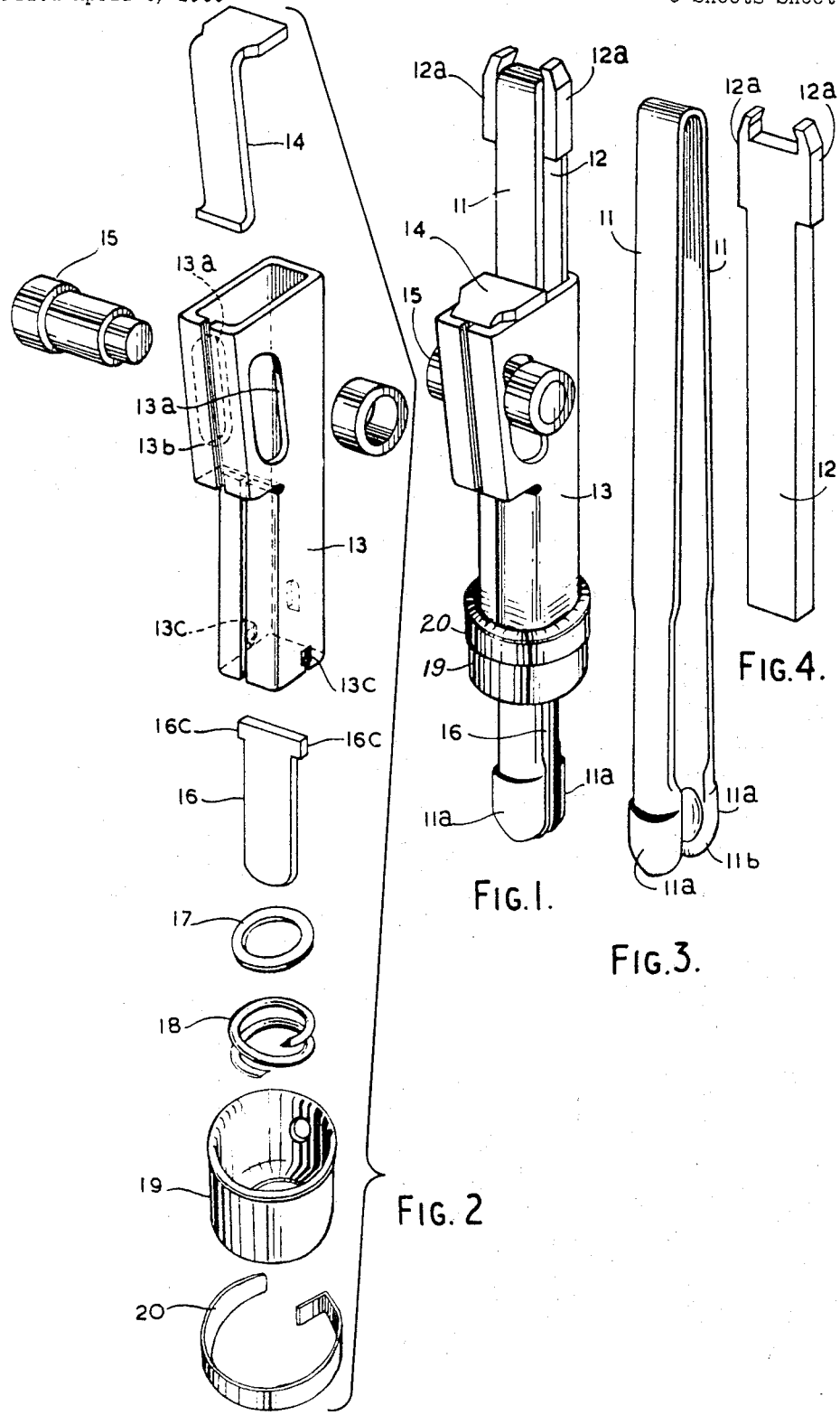

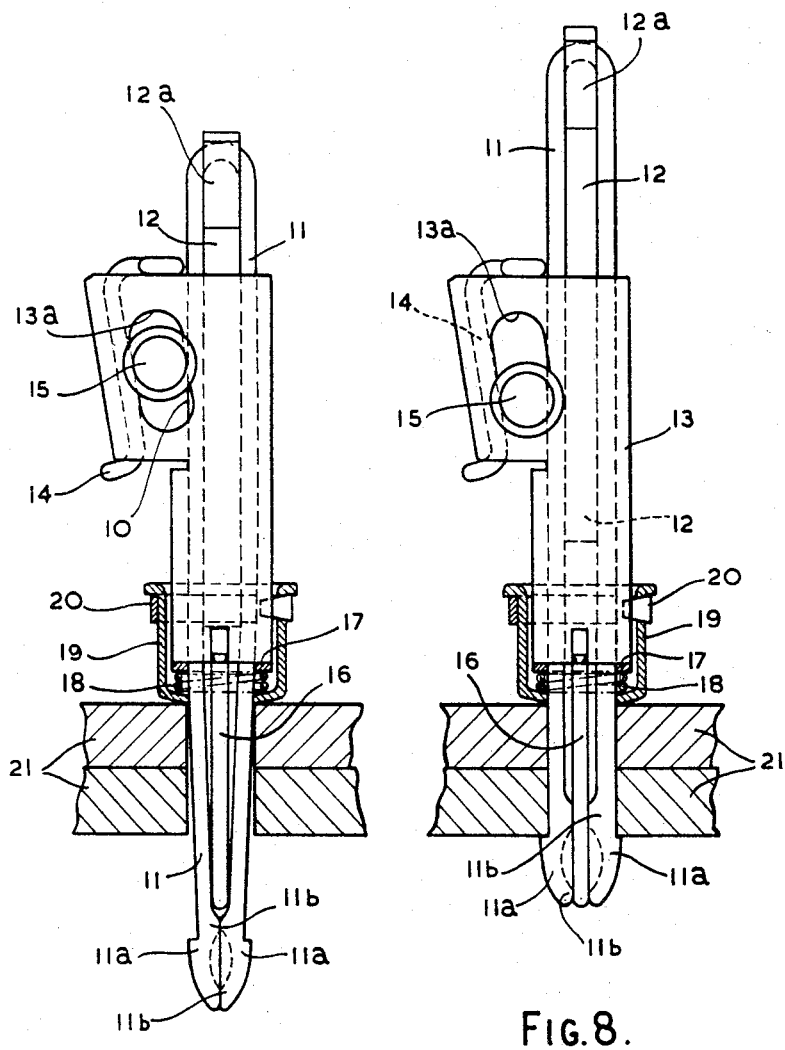

3,414,253
FASTENING DEVICES
Charles Mewse, deceased, late of Welwyn Garden City, England, by Mary Mewse, executrix, Welwyn Garden City, England, assignor to Avdel Limited, Welwyn Garden City, England, a joint-stock company of England
Filed Apr. 8, 1965, Ser. No. 446,748
Claims priority, application Great Britain, Apr. 10, 1964, 14,838/64
3 Claims. (Cl. 269—47)

ABSTRACT OF THE DISCLOSURE

A fastening device for temporarily clamping together apertured sheets comprises a bifurcated claw member with an outward projection at the free end of each limb, a spreader slidable between the limbs to force them apart and attached to a sleeve through which the limbs pass, a locking device of the roller and inclined ramp type between the sleeve and the claw member to lock the sleeve against movement away from free end of the claw member, and a cup-shaped aperture member at one end of the sleeve which is spring urged to press the sheets into contact with the outward projections on the claw member.

---

This invention relates to fastening devices and has for an object to provide an improved fastening device for insertion through an opening in a single member, or through aligned openings in a group of two or more members to be fastened to grip said member(s) between relatively movable parts of the device which, after such insertion are located at the front and rear surfaces respectively of said member, or group of members.

In a fastening device according to the invention a "claw" element has two like limbs which extend alongside one another from joined ends thereof to their other ends where they are free and in the neighbourhood of which they are formed with "claws" or lateral projections from their outer faces, a spreader element is movable along the claw element between the limbs thereof from a position in which it permits their free end portions to approach one another sufficiently for their insertion into and through aligned openings in members to be fastened to a position in which said spreader element extends between said end portions and so holds them apart sufficiently to prevent their withdrawal through said openings, said spreader element is attached to a sleeve through which the claw element extends and which is slidable along the latter to bear against that face of at least two members to be fastened from which the free ends are inserted into and through aligned openings in said members, and, said sleeve is in one-way wedging engagement with the claw element to hold the fastening device in position with the claw element engaging the rearmost face of said members to be fastened thereby and with the sleeve bearing upon the front or foremost face of said member or members.

It is desirable that the sleeve should have at that end thereof which is nearer to the free or claw ends of the limbs of the claw element, a resilient abutment for engaging the face of a member to be fastened. Preferably, such a resilient abutment includes a coiled compression spring and an apertured cup in which the spring is enclosed with the limbs of the claw element extending therethrough and the spring acting between the base of the cup and the lower end of the sleeve which has the open end of the cup extending thereover and carrying an inward projection which extends through an opening in the side of the cup into an axial slot in the sleeve which limits the extension of the spring but permits further compression thereof. Conveniently, in such case, the projection is in the form of an extension inwardly from a clip which surrounds the rim of the cup which has an outturned rim for preventing the clip from tilting.

Preferably also, a wedging roller carried by the sleeve extends across one limb of the claw element between the outer face of the latter and an inwardly directed face of the sleeve which face converges towards said limb of the claw element towards the claw end of the latter.

Provision may be made for the engagement with the wedging roller or ball and with the claw member of a hand or power operated tool for applying between them a force tending to move the former in the wedging direction to secure the fastening device or in the opposite direction to release it.

The invention is illustrated by the accompanying diagrammatic drawings which are not to scale and of which:

FIGURE 1 is a perspective view of one form of fastening device according to the invention which is designed for use as a "sheet gripper" for holding together overlapping parts of metal or other sheets while they are permanently secured together by blind riveting:

FIGURE 2 is a perspective view of the sleeve and associated parts shown separated one from another:

FIGURES 3 and 4 are perspective views of the claw member and a spacer member, respectively:

FIGURE 7 is a side view of the device inserted through aligned openings in two sheets about to be gripped by, or released from, the fastener: and FIGURE 8 is a side view similar to FIGURE 7 but showing the sheets firmly gripped by the device.

Figure 5:
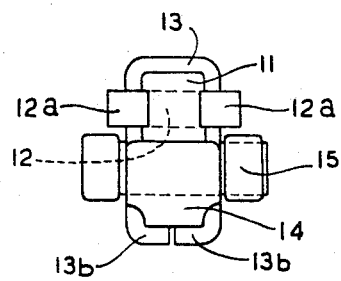
FIGURE 5 is an end view of the assembled sheet gripper.
Figure 6:
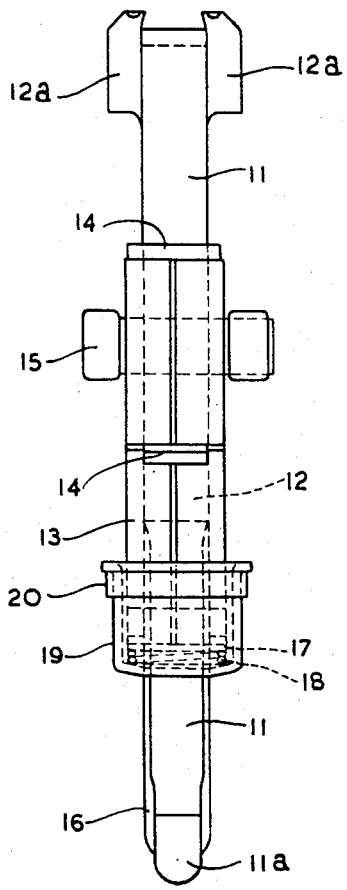
FIGURE 6 is a front view.

As shown a claw element is formed by pressing and bending from a single piece of metal with two limbs 11, 11, which are joined at their upper ends and formed at their free lower ends with "claws" or shaped lateral projections 11a, 11a, from their outer faces and also with projections 11b, 11b, at their inner faces.

A flat spacer member 12 which extends between said limbs 11, 11, from their joined ends throughout the greater part of their length is formed with projections 12a, 12a, which project outwardly and upwardly beyond the joined ends of the limbs 11, 11, and are there deformed to retain the spacer member 12 in position.

A sleeve 13 through which the claw member 11, 11, extends is formed from sheet metal of rectangular cross-section with a lateral extension formed with inclined slots 13a, 13a, through opposite sides thereof and similarly inclined inturned portions 13b, 13b, at its outer part which provide support for a bent plate or track 14 for a roller 15 which extends freely through the inclined slots 13a, 13a, between the plate 14 and the outer face 10 of the neighbouring limb 11 of the claw element. At its lower end the rectangular sleeve 13 is formed with notches 13c, 13c, in which are received tightly lateral extensions 16c, 16c, at the upper end of a tongue-like spreader member 16, acting as a stop which engages the lower end of the spacer member 12 to limit the extent to which the claw element can be moved downwardly through the sleeve 13. This spreader member 16 extends between the limbs 11, 11, of the claw element together with said limbs through a washer 17, a coiled compression spring 18, an apertured cup member 19 and a retaining clip 20. The spring 18 is held compressed between the washer 17 bearing against the lower end of the sleeve 13 and the lower apertured end of the cup member 19 which is held in position axially by the inturned end of the clip 20 extending through an aperture in the side wall of the cup into a slot in the side of the sleeve 13 which is long enough to allow further compression of the spring 18. The cup member 19 has an outturned lip. see FIGURE 2, against which the clip 20 bears when in position, see FIGURE 1, and is thereby prevented from twisting or tilting. It will be seen that the annular lower end face of the cup member 19 acts as a resiliently mounted abutment for the lower end of the sleeve 13.

In use the claw element is moved downwardly through the sleeve 13 so that the spreader 16 is clear of the inwardly projecting faces 11b, 11b, at the ends of its limbs 11, 11, which are then inserted through the aligned openings in two members 21, 21 (FIGURES 7 and 8) to be retained together by the fastening device, until the resiliently mounted cup 19 on the sleeve 13 comes to bear upon the upper face of the upper member 21. Then, with the sleeve 13 held in this position, the claw element is pulled upwardly so that the end portions of its limbs 11, 11, ride onto the opposite faces of the spreader member 16 on the sleeve 13 and are thereby spread and held apart from one another sufficiently for their claws or lateral extensions 11a, 11b, to engage the lower face of the lower member 21 to prevent withdrawal of the device from said members 21, 21. Downward pressure on the roller 15 will cause it to become wedged between the inclined track plate 14 of the sleeve 13 and the neighbouring limb 11 of the claw element to hold said sleeve 13 and said claw element in holding engagement with the members 21, 21, as shown in FIGURE 8. Conveniently, downward pressure upon the roller 15 is used to hold the sleeve 13 against the upper member 21 as the claw member is pulled upwardly through the sleeve 13 to spread the limbs 11a, 11a, and bring them into holding engagement with the lower face of the lower member 21. The resiliently mounted cup 19 bears upon the upper face of the upper member 21 and the spring 18, being held in compression effectively between the sleeve 13 and said upper member 21, tends to maintain a wedging pressure upon the roller 15. It also tends to damp or reduce any resonance effect which may tend to loosen the roller 15 when the device is subject to vibration.

The device is unfastened by loosening the roller 15 for instance by jarring it in an upward direction, and pushing the claw element downwardly through the sleeve 13 to the position shown in FIGURE 7 allowing the lower ends of the limbs of the claw element thus moved clear of the spreader 16, to move together ready to pass through the aligned openings in the members 21, 21.

It will be apparent that a hand tool (not shown), for example, a screw or pivoted arm type or alternatively a pneumatic power tool may be used to effect holding engagement of the fastening device by engaging the projections 12a on the space member 12, on the one hand, and the ends of the roller 15, on the other hand, and urging them apart from one another, the same or a different tool being used, if desired, to effect disengagement by drawing said parts 12a and 15 towards one another.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim:
1. A fastening device for temporarily clamping apertured workpieces in superposed relation comprising:
an elongated bifurcated claw element having outwardly extending lateral projections on the free ends of the limbs thereof;
a spreader element movable along said claw element between the limbs thereof from a position which permits said free ends to approach one another sufficiently for insertion through aligned openings in workpieces to be fastened, to a position in which said spreader element extends between said free ends spreading them apart a distance sufficient to prevent their withdrawal through said opening;
a sleeve surrounding said claw element and slidable therealong to bear against that face of the workpieces to be joined from which said claw element is inserted, the workpiece contacting portion of said sleeve comprising a resilient abutment wherein said resilient abutment includes a coiled compression spring and an apertured cup, said cup enclosing said spring with the limbs of said claw element extending therethrough and said spring action between the base of said cup and the lower end of said sleeve which has the open end of said cup extending thereover and carrying an inward projection which extends through an opening in the side of said cup into an axial slot in said sleeve to limit the extension of said spring but permit further compression thereof;
and means interconnecting said sleeve and said claw element providing a one-way wedging engagement therebetween so that the workpieces are held with the claw element engaging the rearmost face of the workpieces and the sleeve bearing upon the foremost face of the workpieces.

2. A fastening device as claimed in claim 1, wherein the projection is in the form of an extension inwardly from a clip which surrounds the rim of the cup which has an out-turned rim for preventing the clip from tilting.

3. A fastening device for temporarily clamping apertured workpieces in superposed relation comprising:
an elongated bifurcated claw element having outwardly extending lateral projections on the free ends of the limbs thereof;
a sleeve surrounding said claw element and slidable therealong to bear against that face of the workpieces to be joined from which said claw element is inserted;
a spreader element connected to the lower end of said sleeve and depending therefrom, said spreader element being interposed between the limbs of said claw element upon the movement of said sleeve along said claw element;
a closure member positioned on the lower end of said sleeve for engaging a face of one of said workpieces, said closure member having an aperture therein through which said claw element and depending spreader project;
resilient means surrounding said claw element and spreader and interposed between the lower end of said sleeve and said closure member for resiliently cushioning the engagement of said sleeve with the face of said workpiece; and
said sleeve terminating in an enlarged upper portion having inclined slots therein, a wedging roller carried by said slots and arranged to extend across one limb of said claw element to lock said claw element to said sleeve.

References Cited
UNITED STATES PATENTS

| 2,354,638 | 7/1944 | Okerholm | 279—22 X |
| 2,397,892 | 4/1946 | Van Sittert | 85—81 |
| 2,317,315 | 4/1943 | Wallace | 24—211 X |

ROBERT C. RIORDAN, *Primary Examiner.*

JAMES F. McKEOWN, *Assistant Examiner.*

UNITED STATES PATENT OFFICE
CERTIFICATE OF CORRECTION

Patent No. 3,414,253                                December 3, 196

Charles Mewse, deceased, by
Mary Mewse, executrix

It is certified that error appears in the above identified patent and that said Letters Patent are hereby corrected as shown below:

Column 4, line 15, "action" should read -- acting --.

Signed and sealed this 17th day of March 1970.

(SEAL)
Attest:

Edward M. Fletcher, Jr.                    WILLIAM E. SCHUYLER, JR.
Attesting Officer                              Commissioner of Patents